March 29, 1949.  H. S. BROWN ET AL  2,465,574
INSECT ELECTROCUTOR
Filed Feb. 17, 1945  2 Sheets-Sheet 1

INVENTORS:
HERSCHEL S. BROWN,
HELMUTH D. BALLMEYER,
By Kingsland, Rogers & Ezell
ATTORNEYS.

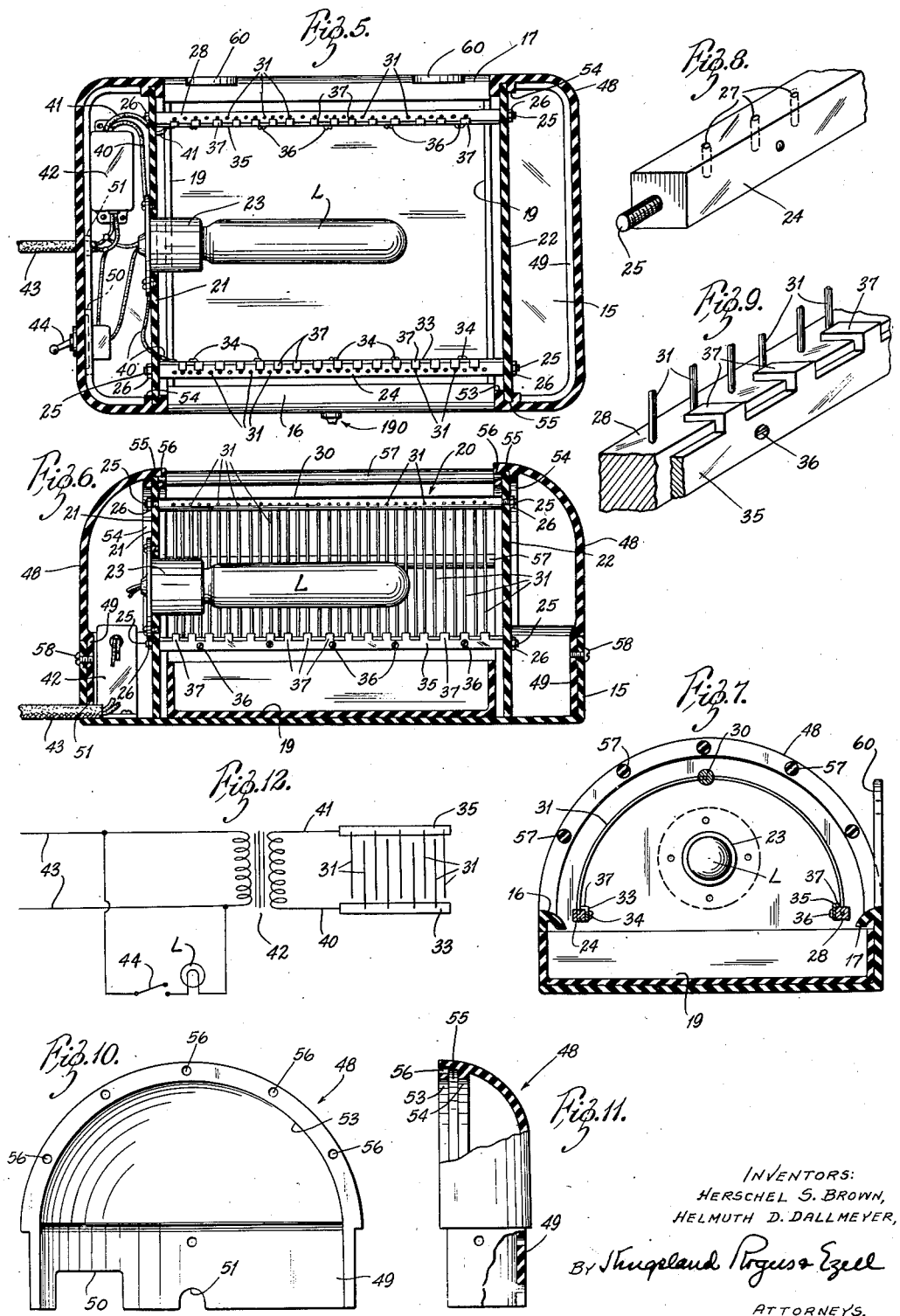

Patented Mar. 29, 1949

2,465,574

UNITED STATES PATENT OFFICE 2,465,574

INSECT ELECTROCUTOR

Herschel S. Brown, St. Louis, and Helmuth D. Dallmeyer, St. Charles, Mo.

Application February 17, 1945, Serial No. 578,382

16 Claims. (Cl. 43—112)

The present invention relates to an insect electrocutor.

It is an object of the invention to provide an insect electrocutor that is both efficient and safe, that is made of a minimum number of parts that are readily assembled and disassembled.

A further object of the invention is to provide an insect electrocutor that may be made of plastic material or the like, and one that contains a grill within a composite base structure to provide a neat and sightly appliance. It is also an object to provide an insect receiving means, preferably a removable tray, within the base, largely enclosed thereby, disposed below an electrocuting grill, with arrangements to assure that insects failing to fall through the grill will, nevertheless, fall into the receiver.

A further object is to provide a grill that may readily be assembled as a unit, with a minimum number of parts requiring individual attachment. Another object is to provide base and end structures interfitting with the grill so that all may be held together by a minimum number of simple fastenings.

A further object is to provide a grill having grill rods supported in a very simple manner that affords quick replaceability, and is not affected adversely by temperature changes.

A further object is to provide a construction wherein the electrical parts are contained in the appliance, and are disposed to require only simple and short connections.

A further object is to provide an insect electrocutor adapted to be changed for insects of different sizes, with a minimum of difficulty.

In the drawings:

Fig. 5 is a horizontal medial section, taken on the line 5—5 of Fig. 2;

Fig. 6 is a vertical end to end section, taken on the line 6—6 of Fig. 3;

Fig. 7 is a transverse section, looking to the left on the line 7—7 of Fig. 2;

Fig. 8 is a fragmentary view of one of the grill supports;

Fig. 9 is a fragmentary view of one of the bus bars;

Fig. 10 is an end view of one of the end shells;

Fig. 11 is an edge view, partly broken away, of the end shell; and

Fig. 12 is a wiring diagram, showing the electrical connections for the device.

Figure 1:
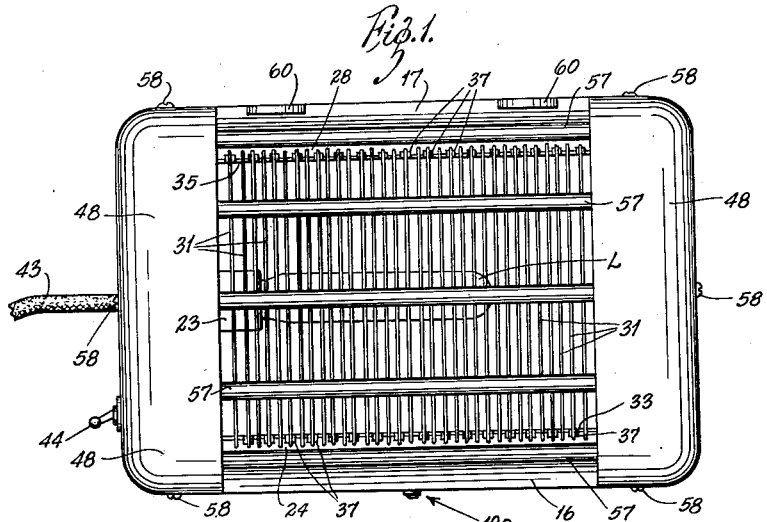
Fig. 1 is a plan view of the device.
Figure 2:
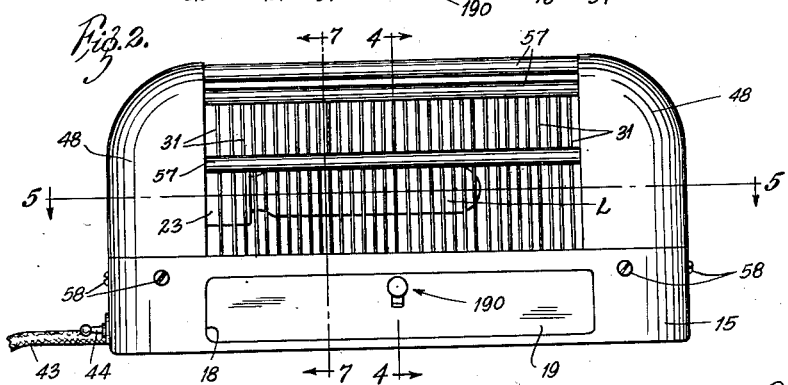
Fig. 2 is a front elevation.
Figure 3:
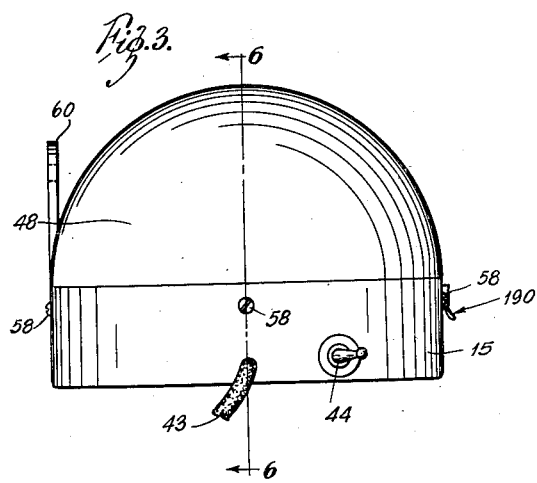
Fig. 3 is an end elevation.
Figure 4:
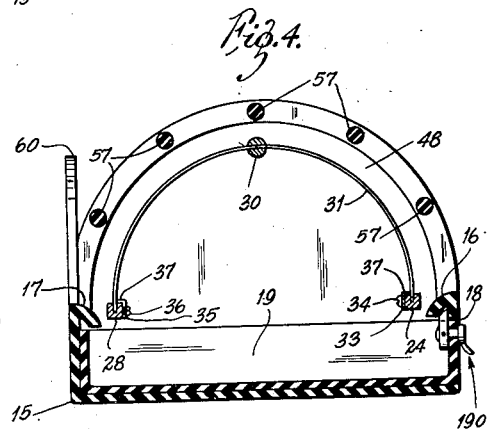
Fig. 4 is a transverse medial section, taken on the line 4—4 of Fig. 2.

The electrocutor includes a base section 15. This base is preferably made of plastic material. It has inturned flanges 16 and 17 along the middle part of the front and rear edges thereof. It has a front opening 18 to receive a drawer 19. This drawer extends from the front to the rear of the device, and extends to the end sections of the base. The overhanging walls 16 and 17 extend over the edges of the drawer so that objects such as dead flies descend thereinto. The drawer has a rotatable latch arrangement 190 whereby it may be removably held in the base.

An electric grid, of a grill construction, generally indicated at 20, is disposed over the middle part of the base. This grill comprises end partitions 21 and 22, preferably made of plastic or other non-conducting material. The partition 21 has a light socket 23 thereon to hold a lamp L, designed to attract the insects.

Across the front of the electrocutor and joining the partitions 21 and 22 is a grill support 24, square in cross section and having threaded end portions 25 passing through the walls 21 and 22 to receive nuts 26 outside the partitions. The bar has holes 27 drilled in from the top surface thereof (Fig. 8) at equally spaced intervals. A corresponding grill support 28 is correspondingly secured adjacent the back of the device between the two walls 21 and 22.

At the middle of the appliance adjacent the top, a non-conducting round rod 30 is fastened in like manner between the two partitions 21 and 22. This rod 30 has holes or notches from front to rear therethrough, corresponding to the holes 27 in the two supports 24 and 28.

A series of grill rods 31, bent to semi-circular shape, have their ends disposed in the openings 27 within the supports 24 and 28, and are held in spaced relationship against lateral and upward displacement by being passed through the corresponding holes in the rod 30.

A bus bar 33 lies along the inner side surface of the grill support 24 and is secured thereto by screws 34. A corresponding bus bar 35 is secured along the inner surface of the other grill support 28 by screws 36.

As appears more clearly in Fig. 9, the bus bars preferably do not extend to the top of the grill supports, thereby inhibiting arcing, but they are provided with a series of lugs 37 extending over the top surfaces of the two grill supports. The lugs 37 are spaced apart the distance between alternate grill rods 31, and extend inwardly across the top surface to make contact with the alternate grill rods, to which they are soldered. The bus bar 33 makes electrical connection with every other grill rod, and the bus bar 35 makes connection with the alternate ones not connected with the bus bar 33.

The bus bars are connected to the opposite leads 40 and 41 of a transformer 42, that is disposed within one end section of the base. This end section likewise receives the partition 21 supporting the socket 23, the incoming power lines 43, a switch 44, and the connections between these various elements, including the light socket.

The grill may be assembled as a unit, the two end partitions 21 and 22 being held together by the supports 24 and 28 and the rod 30. The grill rods and bus bars are located in position. The transformer leads are brought through the partition 21 and connected. Thereupon the end covers and guards may be installed.

The end covers may be identical in construction, and one of them is shown generally at 48 in Figs. 10 and 11. Preferably they are made of plastic material. They include an upper externally rounded portion with an inset bottom 49 adapted to fit into the base and to form a flush outer surface therewith, as shown in Fig. 6. At least one of the covers should be provided with a cut-out portion 50 to clear the switch 44, and a cut-out 51 to receive the power line 43. These covers may be made on the same dies as the cut-out portions do not affect the other end.

The upper portions of the end covers are formed with internally projecting parallel ridges 53 and 54, providing between them a slot 55. They also have a series of holes 56 extending inwardly at the flange 53.

In the final assembly, a plurality of guard rods 57, having reduced ends to fit within the holes 56, are disposed between the two end sections 48, and the sections and rods are held together while both end sections are slipped down from the top to fit the grooves 55 over the partitions 21 and 22. At the latter part of this operation, the lower reduced sections 49 fit within the base section 15. Finally, screws 58 are fastened between the base and the lower sections 49, whereupon the device is completely assembled.

The wiring, as shown in Fig. 12, puts the lamp L across the power lines 43 in parallel with the primary of the transformer 42. The leads 40 and 41 of the secondary of the transformer are connected to the bus bars 33 and 35, which are respectively connected to alternate grill rods 30. The switch 44 is connected so that the lamp L can be turned on or off without effecting power to the transformer 42.

In use, when the power lines 43 are connected to a suitable source of power, the grill will be charged. The transformer steps up the potential across adjacent grill rods to a high voltage such as 2,000 volts, although other voltages may be used. Insects are attracted to bait in tray 19, but must pass the grill rods to reach the bait. As they pass the grill, they come into contact with adjacent grill rods, and, by establishing a current therebetween, are electrocuted. They then fall down into the tray 19, and may be removed at desired times. Those falling through the grill fall directly into the tray. Those not falling through the grill descend along its sloping surfaces and are directed into the tray by the flanges 16 and 17.

It is, of course, understood that bait may be used to attract the insects. The tray is leak proof and will hold liquid bait.

To attract night insects, the lamp L may be turned on and used in lieu of, or in addition to, bait.

The guard rods 57 are close enough together to prevent contact with the grill accidentally.

The device may be disposed on the floor or on a table, or it may be suspended from the ceiling or from the wall. Where it is to be suspended from the wall, the wall brackets 60 may be hooked over suitable fastenings on the wall.

It will be seen that the appliance may be conveniently made of moldable parts or of stampings. Of course, if it be made of metal in certain parts, due consideration must be had for insulation. The insects are conveniently trapped in the tray, and may be disposed of at any time. Many parts are duplicates. The grill rods are all identical, the bus bars are identical, the grill supports are identical, the end partitions 21 and 22 are substantially identical, and the end covers 48 are identical.

Furthermore, the appliance is readily assembled and disassembled. The electrical parts are immediately available upon removal of the end covers 48, which latter are held in position by simple screws 58. The grill rods are readily removable by loosening the rod 30 from the partition and breaking the soldering connection of any individual rod and its bus bar. The bus bars are attached directly to the transformer by very short leads that are simple and easy to make. The device can be used for insects of any size, including insects attracted by bait having an odor and those attracted by a light. The grill rods may be spaced differently by the simple expedient of employing different grill support rods and bus bars. Any insects that fall free without going through the grill are retained within the tray because of the overhanging flanges 16 and 17. Temperature changes do not affect the device because any change in length of the grill rods is absorbed by the projection into the holes of the grill supports, one end of each rod being free.

What is claimed is:

1. An insect electrocutor including a pair of upstanding end supports, a pair of grill supports fastened between the end supports, joining the supports and holding them together in spaced relation, a plurality of separated grill rods removably held in the grill supports, each grill rod spanning from one grill support to the other, and a pair of bus bars adapted to be oppositely charged with electricity, each bus bar being connected to alternate grill rods and one bus bar being connected to the grill rods not connected with the other bus bar.

2. An insect electrocutor including a pair of end supports, a pair of grill supports fastened between the end supports and holding the latter together in spaced relation, a plurality of separated grill rods removably held in the grill supports, each grill rod spanning from one grill support to the other, the grill rods fitting into holes extending downwardly from the top surfaces of the grill support, and a third member held between the two end members and disposed over the grill rods to hold them in place, and a pair of bus bars adapted to be oppositely charged with electricity, each bus bar being connected to alternate grill rods and one bus bar being connected to the grill rods not connected with the other bus bar.

3. An insect electrocutor including a pair of end supports, a pair of grill supports fastened between the end supports and holding the latter together in spaced relation, a plurality of separated grill rods removably held in the grill supports, each grill rod spanning from one grill support to the other, the grill rods fitting into holes extending downwardly from the top surfaces of the grill support, and a third member held between the two end members and disposed over the grill rods to hold them in place, the third member having openings, one to receive each grill rod and hold the same against upward or lateral movement, and a pair of bus bars adapted to be oppositely charged with electricity, each bus bar being connected to alternate grill rods and one bus bar being connected to the grill rods not connected with the other bus bar.

4. An insect electrocutor including a pair of end supports, a pair of grill supports fastened between the end supports, joining the supports and holding them together in spaced relation, a plurality of separated grill rods removably held in the grill supports, each grill rod spanning from one grill support to the other, a pair of bus bars adapted to be oppositely charged with electricity, each bus bar being connected to alternate grill rods and one bus bar being connected to the grill rods not connected with the other bus bar, a base to receive said grill member, and a transformer mounted within said base having leads for connection with said bus bars for oppositely charging the same.

5. An insect electrocutor including a pair of end supports, a pair of grill supports fastened between the end supports, joining the supports and holding them together in spaced relation, a plurality of separated grill rods removably held in the grill supports, each grill rod spanning from one grill support to the other, a pair of bus bars adapted to be oppositely charged with electricity, each bus bar being connected to alternate grill rods and one bus bar being connected to the grill rods not connected with the other bus bar, a base to receive said grill member, a transformer mounted within said base having leads for connection with said bus bars for oppositely charging the same, and end covers extending from the ends of the base to the end members of the grill to provide end enclosures.

6. In an appliance of the kind described, a base, a grill member having alternate, oppositely charged conductors, said grill member being adapted to be mounted on said base, and having end portions between which the conductors are supported, and means having an interfitting engagement with the end portions and removably secured to the base to hold the grill member in fixed position on the base.

7. In an appliance of the kind described, a base, a grill member having adjacent, oppositely charged conductors, said grill member being adapted to be mounted on said base, and having end portions between which the conductors are supported, and means fitting over the end portions and removably secured to the base to hold the grill member in fixed position on the base, said means comprising a pair of members, one for each end portion, each member having an opening to slip over the end portion to hold the same securely, and each member being removably secured to the base.

8. In an appliance of the kind described, a base, a grill member having adjacent, oppositely charged conductors, said grill member being adapted to be mounted on said base, and having end portions between which the conductors are supported, and means fitting over the end portions and removably secured to the base to hold the grill member in fixed position on the base, said means comprising a pair of hollow shell-like members, one for each end portion, each member having an opening to slip over the end portion to hold the same securely, and each member being removably secured to the base, said members and said end portions forming end housings distinct from the portions containing the grill member.

9. In an appliance of the kind described, a base, a grill member having adjacent, oppositely charged conductors, said grill member being adapted to be mounted on said base, and having end portions between which the conductors are supported, means fitting over the end portions and removably secured to the base to hold the grill member in fixed position on the base, said means comprising a pair of hollow shell-like members, one for each end portion, each member having an opening to slip over the end portion to hold the same securely, and each member being removably secured to the base, said members and said end portions forming end housings distinct from the portions containing the grill member, and electrical voltage means disposed in one end housing and connected with the grill member.

10. In an appliance of the kind described, a base, a grill member having adjacent, oppositely charged conductors, said grill member being adapted to be mounted on said base, and having end portions between which the conductors are supported, means having interfitting engagement with the end portions and removably secured to the base to hold the grill member in fixed position on the base, said grill member being spaced above the base, and a removable receiver in the base below the grill member to receive objects falling from the grill member.

11. In an appliance of the kind described, a base, a grill member having adjacent, oppositely charged conductors, said grill member being adapted to be mounted on said base, and having end portions between which the conductors are supported, and means interfitting with the end portions and removably secured to the base to hold the grill member in fixed position on the base, said grill member being slowed and the base and grill member providing passage means adjacent the bottom thereof to pass objects from the grill member into the base.

12. An appliance of the kind described, including an open-top, box-like base, a grill separable as a unit from the base, said grill unit including two upstanding end members, cross members between the end members, and grill conductors extending between the cross members, said grill unit being insertable so as to be upstanding in the base with the grill extending over the upper part thereof, and end parts interfitting over the end members to hold the same against lateral movement on the base and upward movement out of the base, said end parts interfitting with and being removably secured to the base.

13. An appliance of the kind described, including an open-top, box-like base, a grill separable as a unit from the base, said grill unit including two upstanding end members, cross members between the end members, and grill conductors extending between the cross members, and oppositely chargeable bus bars extending along the cross members for connection with the grill conductors to charge adjacent conductors oppositely, said bus bars being removably attached to the respective conductors for electrical conduction therebetween, said grill unit being insertable so as to be upstanding in the base with the grill extending over the upper part thereof, and end parts interfitting over the end members to hold the same against lateral movement on the base and upward movement out of the base, said end parts interfitting with and being removably secured to the base.

14. An appliance of the kind described, including an open-top, box-like base, a grill separable as a unit from the base, said grill unit including two upstanding end members, cross members between the end members, and grill conductors extending between the cross members, said grill unit being insertable so as to be upstanding in the base with the grill extending over the upper part thereof, end parts interfitting over the end members to hold the same against lateral movement on the base and upward movement out of the base, said end parts interfitting with and being removably secured to the base, and a receiver removably held in the base member below the grill unit.

15. An insect electrocutor comprising an open-top, box-like base, a grill separable as a unit from the base, said grill including two end partitions, a pair of grill rod supports removably secured between the partitions at opposite sides thereof to hold the partitions in spaced relation, a third holding bar removably secured between the partitions adjacent the top thereof, said supports having openings thereacross extending downwardly from the top surface thereof, said holding bar having corresponding openings, a plurality of longitudinally arched rods pased freely through the openings in the holding bar with their ends supported in opposite openings of the supports, a pair of bus bars, one secured to each grill support, each bus bar being connected to alternate rods, and the two bus bars being connected to different rods, said grill unit being inserted in the base with the partitions spaced from the ends thereof, a transformer on the base outside one end partition, leads from the transformer connected to the opposite bus bars, a pair of end shells open at their bottom and inner sides, their inner edges having grooves to fit over the partitions, their lower walls interfitting with the walls of the base, whereby the end shells may be fitted downwardly over the end partitions, to engage the same, and hold them in place, one end shell enclosing the transformer, and releasable means securing the end shells to the base.

16. An insect electrocutor comprising a grill unit having a pair of spaced end members, support means providing a pair of grill supports extending between the end members, maintaining them in spaced relation, and forming a frame, means for securing the end members together in said spaced relation, a plurality of conductors of opposite charge extending from one support to the other and arranged transversely of said supports, and a pair of bus bars on the support means, one bus bar being connected to certain of the conductors, and the other bus bar being connected to others of the conductors, and a housing upon which the grill unit is mounted.

HERSCHEL S. BROWN.
HELMUTH D. DALLMEYER.

REFERENCES CITED

The following references are of record in the file of this patent:

UNITED STATES PATENTS

| Number | Name | Date |
|---|---|---|
| 1,062,516 | Tate | May 20, 1913 |
| 1,108,309 | Allen et al. | Aug. 25, 1914 |
| 2,177,846 | Swangren | Oct. 21, 1939 |
| 2,219,743 | Karr | Oct. 29, 1940 |